(12) United States Patent
Mathur et al.

(10) Patent No.: US 8,588,191 B2
(45) Date of Patent: Nov. 19, 2013

(54) METHOD FOR MOBILE TERMINAL ACCESS TO WIRELESS LAN BASED ON ACCESS POINT SERVICES AND SERVICE PARAMETERS

(75) Inventors: Saurabh Mathur, Plainsboro, NJ (US); Junbiao Zhang, Bridgewater, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 759 days.

(21) Appl. No.: 11/664,804

(22) PCT Filed: Oct. 20, 2004

(86) PCT No.: PCT/US2004/035106
§ 371 (c)(1),
(2), (4) Date: Apr. 5, 2007

(87) PCT Pub. No.: WO2006/043956
PCT Pub. Date: Apr. 27, 2006

(65) Prior Publication Data
US 2009/0175250 A1    Jul. 9, 2009

(51) Int. Cl.
*H04W 4/00*    (2009.01)

(52) U.S. Cl.
USPC ............... 370/338; 455/510; 709/223

(58) Field of Classification Search
USPC ............ 455/432.1–435.3, 500–510; 370/328–338
See application file for complete search history.

(56) References Cited

U.S. PATENT DOCUMENTS

| | | | |
|---|---|---|---|
| 5,764,910 A * | 6/1998 | Shachar | 709/223 |
| 6,041,124 A * | 3/2000 | Sugita | 455/414.3 |
| 6,522,881 B1 | 2/2003 | Feder et al. | |
| 6,564,048 B1 * | 5/2003 | Sugita | 370/335 |
| 6,600,917 B1 | 7/2003 | Maupin | |
| 2002/0124082 A1 * | 9/2002 | San Andres et al. | 709/225 |
| 2003/0003933 A1 * | 1/2003 | Deshpande et al. | 455/510 |
| 2003/0181215 A1 | 9/2003 | Cromer et al. | |
| 2004/0006601 A1 * | 1/2004 | Bernstein et al. | 709/207 |
| 2005/0030922 A1 | 2/2005 | Lee et al. | |

FOREIGN PATENT DOCUMENTS

| | | |
|---|---|---|
| EP | 0779717 | 12/1996 |
| EP | 1307003 | 5/2003 |
| EP | 1492276 | 12/2004 |
| JP | 2004023564 | 1/2004 |
| JP | 2004221864 | 8/2004 |
| WO | WO02076024 | 9/2002 |
| WO | WO2004031488 | 4/2004 |
| WO | WO 2004031488 A1 * | 4/2004 |
| WO | WO 2004/064306 | 7/2004 |
| WO | WO2004064437 | 7/2004 |

OTHER PUBLICATIONS

Antipolis, S., Samsung: "Clarification on network selection", 3GPP TSG-SA2 Meeting #42, TDOC S2-043071, Oct. 11-15, 2004, pp. 1-6, XP002332625.
Arkko, J. et al.: "Network Discovery and Selection Problem" Draft-ietf-eap-netsel-problem-02, Oct. 25, 2004, pp. 1-30, XP002332626.
Groeting, W., Siemens AG: "3GPP Requirements for WLAN Selection", IEEE 802.11-04/222RO, Mar. 15, 2004, pp. 1-4, XP002332623.
Hepworth, E., Siemens Roke Manor, UK: "Network Discovery and Selection Problem Statement", IEEE 802.11-04/1021RO, Sep. 10, 2004, pp. 1-6, XP002332624.
International Search Report, dated Jun. 30, 2005.

* cited by examiner

*Primary Examiner* — Kashif Siddiqui
(74) *Attorney, Agent, or Firm* — Robert D. Shedd; Robert B. Levy

(57) ABSTRACT

A wireless LAN provides access to a mobile terminal (MT) utilizing beacon frames to broadcast access point (AP) service specific information. The MT listens to the beacon frames and compares the broadcast service(s) and service parameters to a predetermined service profile stored in the MT. When the services offered by an AP matches the services designated in the stored service profile, the MT associates with that particular AP.

16 Claims, 3 Drawing Sheets

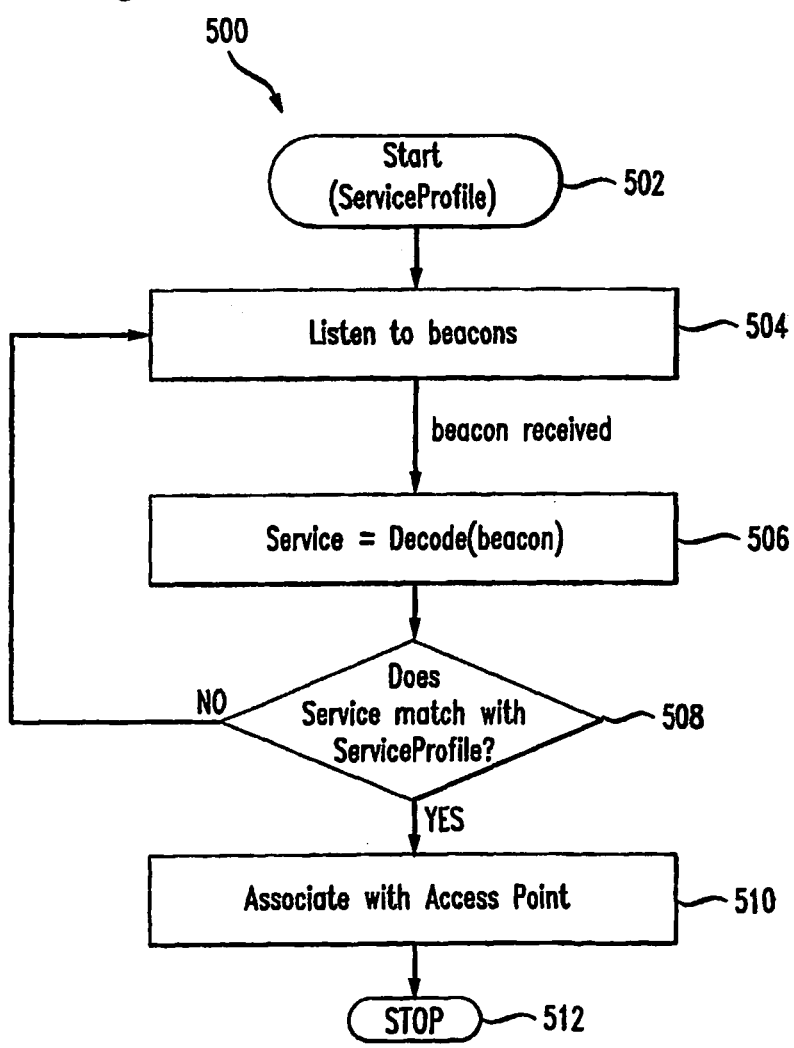

METHOD FOR MOBILE TERMINAL ACCESS TO WIRELESS LAN BASED ON ACCESS POINT SERVICES AND SERVICE PARAMETERS

This application claims the benefit, under 35 U.S.C. §365 of International Application PCT/US04/035106, filed Oct. 20, 2004, which was published in accordance with PCT Article 21(2) on Apr. 27, 2006 in English.

BACKGROUND OF THE INVENTION

1. Field of the Invention

The present invention relates to wireless local area networks (LAN). More particularly, it relates to a method for mobile terminal access to a wireless LAN based on access point (AP) services and service parameters using the beacon frames of the AP.

2. Description of the Prior Art

Mobile terminals (MT) can associate with a wireless LAN based on the Service Set Identity (SSID) that is periodically broadcast by the APs in the beacon frames. Currently, SSID is a human readable byte string that is arbitrarily set by network administrators. In order for the MT to associate with a wireless LAN, the user, of the MT (i.e., the consumer) must manually set the SSID of a specific AP in the wireless LAN or configure the MT to choose any AP. In the latter case, generally the MT associates with the AP that has the highest signal strength.

There are several limitations of the current MT/wireless LAN association scheme. More particularly: 1) The network administrators must inform the users of the SSIDs of the available APs and the services they offer; 2) The users must manually configure their MTs to use either a specific SSID or any SSID; and 3) The SSIDs are arbitrarily set and provide no information about the services and/or capabilities of the AP.

In the case of public wireless LAN hot spots such as airports and hotels, the situation becomes more complex where several service providers deploy APs in the same geographical location. Thus, the visitors or guests who wish to use the wireless LAN services of a specific service provider must first determine the SSID of the AP that belongs to that service provider and then manually configure their MT. This can become unduly burdensome to the user, not to mention requires the user to have appropriate knowledge of how to configure their MT for such access.

Currently, there is no mechanism that allows the MTs to discover the services and service parameters offered by the APs and then automatically choose an AP based on user specified preferences. A partial solution that is currently available uses configuration profiles. Configuration profiles are simply a set of configuration options that are persistently stored on the MT. Thus, instead of manually configuring all the wireless LAN parameters every time the user changes a network association, he/she simply loads them from the configuration profile. This mechanism does not support any automatic selection of an AP based on the services that it offers, and still requires the users to have knowledge of the specific SSIDs.

It is therefore desirable for the MTs to learn the details of an AP without requiring any manual intervention by the user. Examples of some of these details could be: 1) Who is the provider of the wireless LAN service?; 2) What kind of services does it offer (Internet access, Walled-Garden services, etc.)?; and 3) What are the parameters of the offered services (Quality of Service, cost, etc.)?

SUMMARY OF THE INVENTION

According to one aspect of the invention, the method for mobile terminal access to a wireless local area network includes broadcasting service information relating to an access point in the wireless local area network, and associating the mobile terminal with the access point when the broadcasted service information matches a service profile stored in the mobile terminal.

The broadcasting of the service information can be performed using at least one beacon frame of the access point, and can include service parameters of the access point.

In accordance with another aspect of the invention, the broadcasting of service information is performed using existing service set identities (SSID) of the beacon frames. This can includes identifying a service list of the access point, and encoding service set identities (SSID) corresponding to the service list.

In accordance with other aspects of the invention, the mobile terminal associates with the access point by establishing the service profile in the mobile terminal, listening to the beacons broadcast by the access point, and determining whether the service information contained in the broadcast beacons matches the service profile. The user creates the service profile in their mobile terminal that specifies the services and the service parameters that he/she is interested in. The Mobile terminal then automatically selects an access point if it provides the service that matches the previously stored service profile.

Other aspects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views:

FIG. 5 is flow diagram of the mobile terminal (MT) procedure according to an embodiment of the invention.

DETAILED DESCRIPTION OF PREFERRED EMBODIMENTS

In accordance with a preferred embodiment of the present principles, the use semantic SSIDs allows an AP to advertise its services and service parameters in the beacon frames. The user sets up a service profile on his/her MT that will specify the services and the service parameters that he/she is interested in. Once configured with a service profile, the MT can automatically select an AP if it provides the user specified services.

Unlike the current SSIDs that have no meaning associated with them, semantic SSIDs are terse descriptions of services. They provide a simple and extensible mechanism that allows APs to advertise the services that they offer. The following is the Backus Naur Form (BNF) representation of the verbose form of the semantic SSID:

TABLE 1

```
<ssid> ::= <provider-id> <service>
<service> ::= <service-id> <service-param-sequence>
<service-param-sequence> ::= <service-param> | <service-param>
<service-param-sequence>
<service-param> ::= <param-id> <param-value>
<provider-id> ::= < number>
<service-id> ::= <number>
<param-id>::= <number>
<param-value>::= <number>
<number> ::= <digit> | <digit> <number>
<digit> ::= 0 | 1 | 2 | 3 | 4 | 5 | 6 | 7 | 8 | 9
```

As an example, consider the following verbose semantic SSID:

<Acme Wireless, gold Internet service, cost=30 cents per minute, bandwidth=11 Mbps>

This SSID is part of the beacon frame that is broadcast periodically by the AP. Thus, a client (i.e., mobile terminal) can easily determine that this particular AP provides an Internet access service from Acme Wireless that costs 30 cents per minute and provides a bandwidth of 11 Mbps. Depending on the wireless LAN technology, the SSID-field in the beacon frame may not be sufficiently long to advertise all the services in a verbose manner within a single beacon. For example, in 802.11b, the SSID field is only 32 octets long (see FIG. 1). In order to overcome this potential problem, the following solutions are provided:

1. SSID Encoding: Instead of a verbose, human-readable byte string, a service and its parameters can be encoded to compress the SSID. However, legacy MTs would expect the SSID to be a null terminated character string. An encoded, compressed string may confuse the legacy MT and it will be unable to use the APs that employ the proposed scheme. To overcome this potential difficulty, the first "n" octets of the SSID are designated as the legacy SSID that the legacy MTs expect. The remaining octets contain the semantic part of the SSID. For example consider the SSID field format in 802.11b as shown in FIG. 2.

Figure 2:
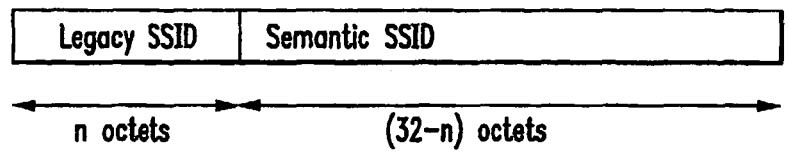
FIG. 2 is schematic representation of the SSID part of beacon frame shown in FIG. 1.
Figure 3:
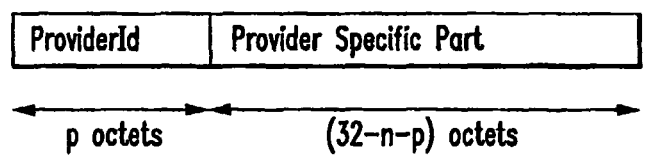
FIG. 3 is a schematic representation of the format of a semantic SSID according to an embodiment of the invention.

The first "n" octets of the SSID field will be used for the legacy SSID and the remaining (32−n) octets will be used for the semantic SSID (FIG. 2). Referring to FIG. 3, the first "p" octets of the semantic SSID would specify the identity of service provider (ProviderID). The remaining (32−n−p) octets are provider specific service encodings. Each service provider provides a service-dictionary that the MTs can download from a pre-advertised source. These dictionaries facilitate interpretation of the service parameters offered by that AP. Using the previous example of verbose semantic SSID:

Acme Wireless, Gold Internet, cost=30 cents per minute, bandwidth=11 Mbps>

An example service dictionary from Acme Wireless that has been assigned a provider ID of 256 would be as follows:

TABLE 2

| Service | Service Id |
| --- | --- |
| Bronze Internet | 1 |
| Gold Internet | 2 |

TABLE 3

| Parameter Id | Meaning |
| --- | --- |
| 12 | Cost in cents per minutes |
| 25 | Bandwidth in Mbps |

Figure 1:
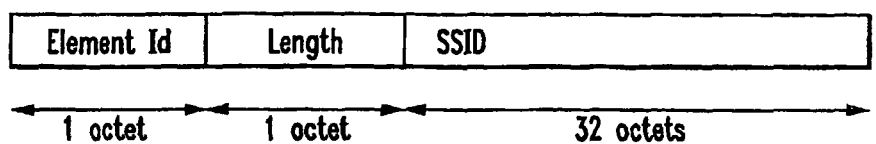
FIG. 1 is schematic representation of the format of a beacon frame in an 802.11b SSID element as used by APs according to an embodiment of the invention.

The encoding of semantic SSID in FIG. 1 using the above service dictionary would be: <256:2:12:30:25:11>
This translates to:

| | |
| --- | --- |
| Provider ID | 256 (Acme Wireless) |
| Service ID | 2 (Gold Internet service) |
| Parameter ID 12 value | 30 (Cost in cents per minutes) |
| Parameter ID 25 value | 11 (Bandwidth in Mbps) |

Note that this example uses an encoding that favors readability over size. Those of ordinary skill in the art recognize that other encoding techniques can be employed without departing from the spirit of the present invention. For example, in practice a space efficient encoding that may not be readable could be employed.

2. Plural Beaconing: According to an aspect of the invention, it is contemplated to allow the AP to advertise its services across several beacon frames, rather than advertising all the services in a single beacon frame. Thus, for example, if an AP offers three services S1, S2, S3, then the first beacon can advertise S1 the second S2 and the third S3, etc. This cycle can be repeated indefinitely. Plural beaconing allows an AP to advertise multiple services in spite of the size limitation of the SSID field.

According to yet another aspect of the invention, rather than use the existing SSID field in the beacon frame, an alternate approach would be to add a new field (or fields) (also called an Information Element) to the beacon frames. The new information element(s) will then be used for encoding the service information. The advantage of using this approach is that the existing SSID field remains completely unaffected and by adding several information elements related to services being offered by the AP into a single beacon, plural beaconing can be avoided. The only potential disadvantage in this approach is that this involves changing the format of the standard beacon frame.

Access Point Procedure

Figure 4:
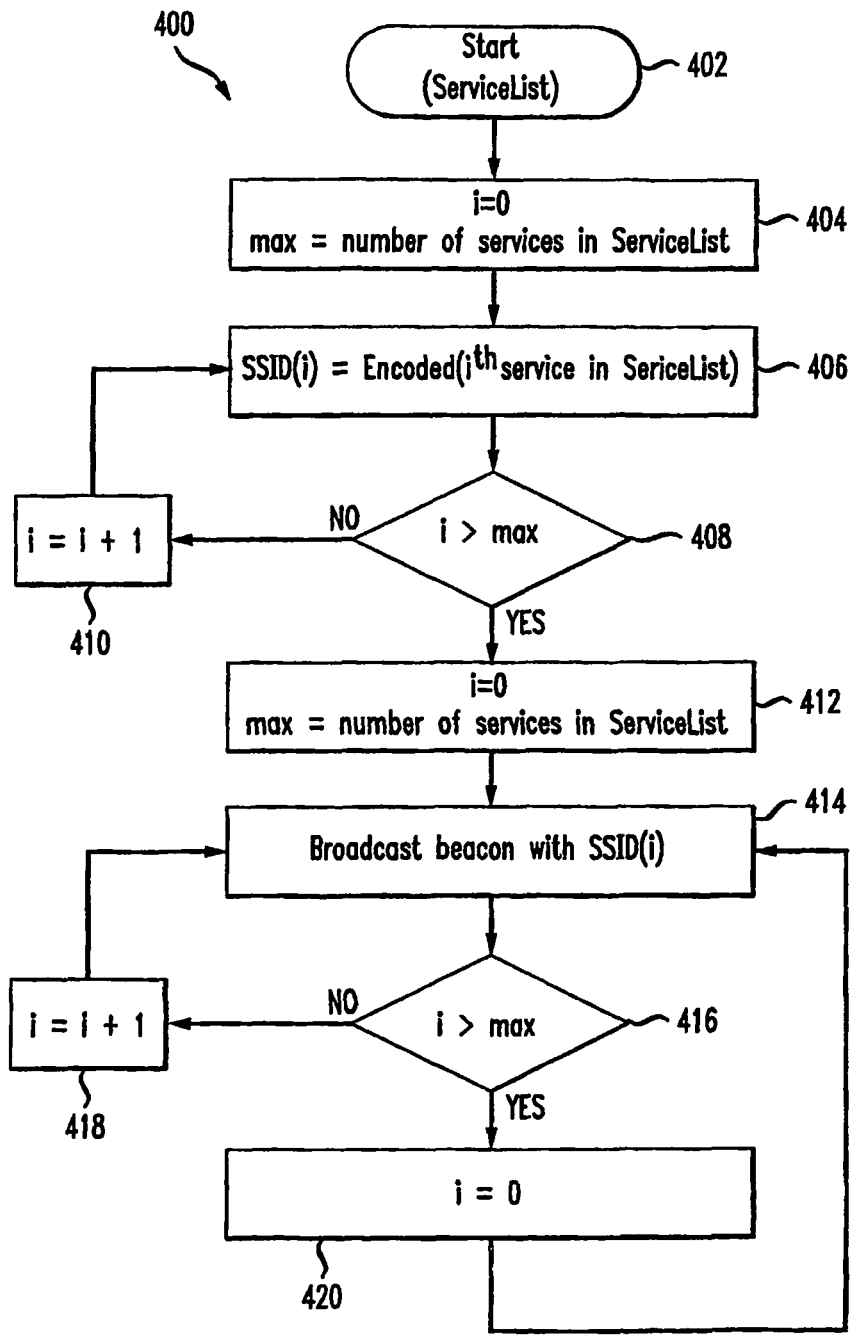
FIG. 4 is a flow diagram of the access point (AP) procedure according to an embodiment of the invention.

FIG. 4 shows a flow diagram of the access point (AP) procedure 400 according to an aspect of the invention. In this embodiment, the access point starts with a list of services that it offers 402. The number of services in the service list are identified (404) and set to equal a "max" value. An initial value (i) is set to zero. All of the services are then encoded into a format that is optimized for space (steps 406-412). This process simply steps through each identified service and sets the SSID to the encoded service for each of the same. In a plural beaconing environment, this process is repeated for the next beacon where the AP sets the SSID field to the encoded form of the 2nd service. It continues changing the SSID field on a per service basis. Upon exhaustion of the service list, the whole cycle repeats. Each SSID is then broadcast (414) and the cycle (416-420) repeats.

Mobile Terminal Procedure

FIG. 5 shows a flow diagram of the mobile terminal (MT) procedure 500 according to an aspect of the invention. As discussed previously, the user provides a service profile to the MT that contains the service and the service parameters that the user is interested in (502). The MT listens to the beacon frames broadcast by the APs (504). On receiving an encoded beacon the MT decodes it using the pre-downloaded service dictionaries and matches it with the service profile (506). If the two match (508), the MT associates with the access point (510) by providing an such an indication for receipt by the access point. If the decoded beacon does not match the service profile at step 508, the MT continues to listen to the beacons (504) in search of the AP providing the desired services.

Example Scenario

Consider, for example, a scenario in a public hot spot that has three Access Points: AP1, AP2 and AP3. AP1 belongs to provider P1 that offers Internet access service with a bandwidth of 5 Mbps at a cost of 10 cents per minute. AP2 belongs to provider P2 that provides Internet access service with a bandwidth of 10 Mbps at a cost of 15 cents per minute. AP3 is owned by provider P3 and offers a local Intranet access service that is free of charge and has no other service parameter. The following show the possible semantic part of the SSIDs for the three APs respectively:

<P1_Identity:Internet_Service:10:5>
<P2_Identity:Internet_Service:15:10>
<P3_Identity:Local_Intranet_Service:0>

Now consider two users, U1 and U2 that are in possession of two mobile terminals, M1 and M2 respectively. U1 created a service profile S1 to automatically choose an AP that provides Internet access service from any provider that costs 12 cents or less per minute. U2 has a service contract with provider P2 so U2's profile is to look for an Internet access service that is specifically provided by P2.

The MTs for both users would listen to the beacons from the three APs. Using the pre-downloaded service dictionaries, MTs decode the SSIDs and match them with the user's service profile. MT1 finds that AP1 provides the Internet access service through provider P1 at a cost of 10 cents per minute. This matches U1's criteria that he specified in his service profile. Thus, MT1 associates with AP1. On the other hand, MT2 matches AP2 to U2's service profile and hence associates with AP2.

It is to be understood that the present invention may be implemented in various forms of hardware, software, firmware, special-purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a consumer electronic platform having hardware such as one or more central processing units (CPU) and a random access memory (RAM). The consumer electronic platform also includes an operating system and microinstruction code. The various processes and functions described herein may either be part of the microinstruction code or part of the application program (or a combination thereof) that is executed via the operating system.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

While there has been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

The invention claimed is:

1. A method for mobile terminal access to a wireless network comprising:
   receiving compressed encoded service information at the mobile terminal periodically broadcast from an access point, the compressed encoded service information relating to one or more services provided by the access point in the wireless network;
   receiving at the mobile terminal a service dictionary associated with one or more services provided by the access point for facilitating interpretation of said compressed encoded service information for the access point, said service dictionary providing translation between said compressed encoded service information and its corresponding meaning as service information;
   interpreting said compressed encoded service information based, at least in part, on said service dictionary to generate said service information; and
   associating the mobile terminal with the access point when the service information matches a service profile stored in the mobile terminal, wherein the service profile defines one or more services sought for use by the mobile terminal.

2. The method according to claim 1, wherein said receiving step further comprises receiving at least one beacon frame from the access point, said at least one beacon frame including said compressed encoded service information.

3. The method according to claim 1, wherein said compressed encoded service information includes service parameters of the access point.

4. The method according to claim 2, wherein said compressed encoded service information is augmented with existing service set identities (SSID) of the access point.

5. The method according to claim 2, wherein said compressed encoded service information includes an Information element added to the at least one beacon frame.

6. The method according to claim 2, wherein said step of associating further comprises the steps of:
   establishing the service profile in the mobile terminal;
   listening to the at least one beacon frame broadcast by the access point; and determining whether the compressed encoded service information contained in the at least one beacon frame relates to service information that matches the service profile.

7. The method according to claim 6, wherein the mobile terminal continues listening to successive beacon frames when the compressed encoded service information of the at least one received beacon frame relates to service information that does not match the service profile of the mobile terminal.

8. The method according to claim 4, wherein said SSID comprises a semantic SSID that includes a service provider identifier.

9. A method for providing mobile terminal access to a wireless network comprising:
   periodically broadcasting compressed encoded service information to a mobile terminal relating to one or more services provided by an access point in the wireless network;
   communicating to said mobile terminal a service dictionary associated with one or more services provided by the access point for facilitating interpretation of said compressed encoded service information for the access point in generating service information, said service dictionary providing translation between said compressed encoded service information and its corresponding meaning as service information; and
   receiving at the access point an indication that the mobile terminal has associated with the access point when the service information matches a service profile stored in the mobile terminal, wherein the service profile defines one or more services sought for use by the mobile terminal.

10. The method according to claim 9, wherein said step of broadcasting further comprises:
    identifying a service list of the access point;
    encoding service set identities (SSID) corresponding to the service list; and
    broadcasting at least one beacon frame with the encoded SSID corresponding to at least one service in the identified service list of the access point.

11. The method according to claim 10, wherein said broadcasting is performed using an information element added to the at least one beacon frame.

12. The method according to claim 10, wherein said SSID comprises a semantic SSID that includes a service provider identifier.

13. The method according to claim 1, wherein said compressed encoded service information is provided in a semantic service set identifier that includes at least a service parameter identifier listed in said service dictionary.

14. The method according to claim 9, wherein said compressed encoded service information is provided in a semantic service set identifier that includes at least a service parameter identifier listed in said service dictionary.

15. The method as defined in claim 1, wherein said receiving step further comprises receiving at least first and second beacon frames from the access point, said at least first and second beacon frames each including said compressed encoded service information relating to a service and its service information provided by the access point, wherein the service and its service information identified by the compressed encoded service information in the at least first beacon is different from the service and its service information identified by the compressed encoded service information in the at least second beacon.

16. The method as defined in claim 9, wherein said communicating step further comprises communicating at least first and second beacon frames from the access point, said at least first and second beacon frames each including said compressed encoded service information relating to a service and its service information provided by the access point, wherein the service and its service information identified by the compressed encoded service information in the at least first beacon is different from the service and its service information identified by the compressed encoded service information in the at least second beacon.

* * * * *